(12) United States Patent
Brendle

(10) Patent No.: US 9,504,350 B2
(45) Date of Patent: Nov. 29, 2016

(54) BREWING DEVICE AND COFFEE MACHINE HAVING A BREWING DEVICE

(75) Inventor: Christian Brendle, Erlen (CH)

(73) Assignee: Eugster/Frismag AG, Amriswil (CH)

( * ) Notice: Subject to any disclaimer, the term of this patent is extended or adjusted under 35 U.S.C. 154(b) by 206 days.

(21) Appl. No.: 13/979,559

(22) PCT Filed: Sep. 5, 2012

(86) PCT No.: PCT/EP2012/067347
§ 371 (c)(1),
(2), (4) Date: Jul. 12, 2013

(87) PCT Pub. No.: WO2013/041378
PCT Pub. Date: Mar. 28, 2013

(65) Prior Publication Data
US 2014/0298998 A1    Oct. 9, 2014

(30) Foreign Application Priority Data

Sep. 23, 2011 (DE) .......................... 10 2011 053 905

(51) Int. Cl.
*A47J 31/00* (2006.01)
*A47J 31/44* (2006.01)
(Continued)

(52) U.S. Cl.
CPC ............. *A47J 31/60* (2013.01); *A47J 31/3614* (2013.01); *A47J 31/3619* (2013.01); *A47J 31/005* (2013.01); *A47J 31/56* (2013.01)

(58) Field of Classification Search
CPC ...... A47J 31/3614; A47J 31/56; A47J 31/02; A47J 31/0663; A47J 31/20; A47J 31/005
USPC ....... 99/289 R, 283, 299, 302 R, 302 P, 287, 99/279, 297
See application file for complete search history.

(56) References Cited

U.S. PATENT DOCUMENTS

| 3,369,478 A | 2/1968 | Black |
| 4,389,924 A | 6/1983 | Hoesselbarth |

(Continued)

FOREIGN PATENT DOCUMENTS

| CN | 101683239 A | 3/2010 |
| DE | 1679085 A1 | 4/1971 |

(Continued)

OTHER PUBLICATIONS

Chinese Office action for Application No. 201280004709.8 dated Feb. 10, 2015.

*Primary Examiner* — Dana Ross
*Assistant Examiner* — Hemant Mathew
(74) *Attorney, Agent, or Firm* — Bachman & LaPointe, PC

(57) ABSTRACT

A brewing device for a coffee machine, comprising a filter retainer (3), which holds a retention filter (6) for ground coffee beans and which is designed in particular as a filter carrier, a brewing cylinder (4), which can be moved relative to the filter retainer (3) between a loading position for ground coffee beans and a brewing position and which bounds a brewing chamber (13) together with the retention filter (6) of the filter retainer (3) in the brewing position, which brewing chamber has an inlet for pressurized brewing water, wherein a brewing chamber bottom can be moved within the brewing cylinder and the brewing cylinder can be moved into the loading position relative to a scraper in a movement step in order to scrape a cake of used grounds from the brewing chamber, and a cleaning element (7) for removing used coffee grounds adhering to the retention filter (6) after a brewing process during a cleaning motion.

11 Claims, 6 Drawing Sheets

(51) Int. Cl.
*A47J 31/40* (2006.01)
*A47J 31/60* (2006.01)
*A47J 31/36* (2006.01)
*A47J 31/56* (2006.01)

(56) References Cited

U.S. PATENT DOCUMENTS

| | | | | |
|---|---|---|---|---|
| 4,681,028 A | * | 7/1987 | Schmed | A47J 31/3609 99/289 R |
| 4,796,521 A | * | 1/1989 | Grossi | A47J 31/3609 99/287 |
| 4,885,986 A | * | 12/1989 | Grossi | A47J 31/3619 99/289 R |
| 5,259,296 A | * | 11/1993 | Mikael | A47J 31/3614 99/280 |
| 5,638,739 A | | 6/1997 | Shaanan et al. | |
| 6,739,240 B2 | * | 5/2004 | De Koning | A47J 31/36 99/283 |
| 7,024,985 B2 | * | 4/2006 | Park | A47J 31/3619 99/289 R |
| 8,250,969 B2 | * | 8/2012 | Sampaoli | A47J 31/3619 99/287 |
| 2003/0116026 A1 | * | 6/2003 | Koning | A47J 31/36 99/279 |
| 2010/0186598 A1 | * | 7/2010 | De' Longhi | A47J 31/3619 99/289 R |
| 2010/0192778 A1 | | 8/2010 | Magno | |
| 2010/0236417 A1 | * | 9/2010 | Sampaoli | A47J 31/3619 99/287 |
| 2010/0236418 A1 | * | 9/2010 | Sampaoli | A47J 31/3614 99/287 |

FOREIGN PATENT DOCUMENTS

| | | |
|---|---|---|
| DE | 3014452 A1 | 10/1981 |
| EP | 1336365 A1 | 8/2003 |
| KR | 20090112956 A | 10/2009 |
| WO | 2009007804 A1 | 1/2009 |
| WO | 2009021395 A1 | 2/2009 |
| WO | 2012114218 A1 | 8/2012 |

* cited by examiner

BREWING DEVICE AND COFFEE MACHINE HAVING A BREWING DEVICE

BACKGROUND OF THE INVENTION

The invention relates to a brewing device for a coffee machine comprising a filter carrier (in particular a brewing piston) holding a retention filter for ground coffee beans (coffee powder) and a brewing cylinder movable between a loading position for ground coffee beans and a brewing position, which brewing cylinder bounds a brewing chamber together with the retention filter in the brewing position, which brewing chamber has an inlet for pressurised brewing water, and a cleaning element for removing solid brewing residues adhering to the retention filter after a brewing process during a cleaning motion.

Known automatic coffee machines comprise permanently integrated or alternatively removable brewing devices (for cleaning purposes) for brewing the coffee. The known brewing devices comprise, depending on their construction, a multipart brewing chamber into which pressurised hot brewing water is fed, which flows through the ground coffee beans, i.e. the coffee powder in it thereby leaching it, wherein the resulting coffee liquid leaves the brewing chamber through a retention filter such as a metallic sieve in direction of an outlet. The brewing chamber, on its circumference, is bounded by a brewing cylinder which can be moved between a previously described brewing position, in which the coffee is brewed and in which the brewing chamber is closed by the retention filter, and a filling position, in which the brewing cylinder prior to a brewing process, is filled with coffee powder usually freshly ground by an integral coffee grinder.

Following a brewing process the brewing cylinder is (again) moved in direction of its loading position (filling position), relative to a scraper, which scrapes the remaining cake of solid brewing residues (coffee powder cake) from a cylinder bottom which as a rule, is movable within the brewing cylinder. During this scraping the brewing cylinder performs a rotational movement, whilst, at the same time, a cleaning element implemented as a metal bracket and affixed to the outside of the brewing cylinder is rotationally pivoted past the retention filter at a short distance with the aim of removing the solid brewing residues still adhering to the retention filter.

With known brewing devices some solid brewing residues frequently remain on the retention filter even after the rotational cleaning motion of the cleaning element, which then are still present in the brewing chamber during a later brewing process and may have an adverse effect on the taste of the coffee. Moreover there is the danger of the tiny filter openings in the retention filter getting partially clogged, if the residual solid brewing residues dry up and adhere to the retention filter in case of a longer time delay between brewing operations.

The DE 1 679 085 A discloses an automatic coffee machine with a brewing device, in which the cake of solid brewing residues remains on a retention filter after a brewing process and is removed from the same by means of a scraper, thereby cleaning the retention filter at the same time.

The U.S. Pat. No. 5,638,739 A has discloses a brewing device in which the cake of solid brewing residues remains on the retention filter and is removed from the same be means of a pusher.

The DE 30 14 452 A1 also discloses a brewing device, in which the cake of solid brewing residues remains on a retention filter after a brewing process and is cleared away from the same by means of a pusher.

Based on the above-mentioned state of the art the invention is based on the requirement to propose an improved brewing device, with which improved cleaning of the retention filter is ensured. In particular build-ups of solid brewing residues on the retention filter and/or on the filter carrier holding the retention filter shall be avoided. In addition the invention consists in proposing a coffee machine, in particular a fully automatic coffee machine with an improved brewing device of a kind which can be permanently integrated with the coffee machine or can be alternatively arranged, preferably removably, in a simple manner for cleaning purposes.

SUMMARY OF THE INVENTION

The foregoing requirement is met by means of a coffee machine wherein the coffee machine is preferably implemented as a fully automatic coffee machine which in addition to the brewing unit comprises a grinding unit for grinding coffee beans.

Advantageous further developments of the invention are indicated in the sub-claims. The scope of the invention encompasses all combinations of at least two of the characteristics disclosed in the description, the claims and/or the figures.

The invention is based on the idea—in a generic coffee machine, in which the bottom of the solid brewing residues following the brewing process is not left on the retention filter but below the retention filter on the cylinder bottom and, in particular, is pushed off the cylinder bottom by actively pivoting the cylinder bottom (with brewing cylinder) relative to a scraper—to improve the cleaning action of the cleaning element associated with the filter carrier and/or the retention filter in that a spring force is effective between the cleaning element and the filter carrier or the retention filter, which ensures that the cleaning element during its relative motion toward the retention filter, in particular a metallic sieve body, touches the retention filter and/or the filter carrier, i.e. rubs or (mechanically) scrapes along it in order to hereby remove any still adhering solid brewing residues without leaving any residue if possible. This shall ensure improved cleaning of the filter carrier and/or retention filter preferably arranged above and not cleaning of the cylinder bottom (brewing chamber bottom) still holding the cake of solid brewing residues, the cylinder bottom being cleaned (separately) by pivoting it relative to the scraper. In addition, the spring force has the effect that any manufacturing tolerances or tolerances arising during operation can be overcome, thereby ensuring optimal cleaning behaviour throughout the lifetime of the brewing device. In principle it is possible to have a spring force acting upon either the filter carrier in direction of the cleaning element and/or upon the cleaning element in direction of the retention filter, wherein the latter variant is the preferred variant. In any case the essential fact is that a touching motion of the cleaning element is achieved along the retention filter and/or the filter carrier in order to obtain an improved cleaning result. As a result an overall improvement in coffee quality is achieved in subsequent brewing operations. In addition tiny filter openings are reliably prevented from getting clogged by any adhering and drying solid brewing residues.

The filter carrier is preferably a brewing piston which can be moved into the interior of the brewing cylinder. Further preferably the filter retainer is spring-loaded in a manner known as such, in such a way that at the end of a brewing operation, as pressure in the brewing cylinder lessens, this is automatically moved into the interior of the brewing cylinder in order to press the solid brewing residues dry, in particular in direction of a catchment trough in the coffee machine.

According to the invention provision is made for the cleaning element to be spring-loaded by means of a first compression spring during the cleaning motion away from the brewing cylinder in direction toward the retention filter. It is particularly preferred if the first compression spring is indirectly or directly attached to the brewing cylinder, or if the first compression spring is supported against a spring stop which is formed by the brewing cylinder or is attached to the same.

It is most particularly preferred if the cleaning element is movably arranged in such a way that during its cleaning motion it is moved, at least along a partial section of this cleaning motion, in parallel with the retention filter or with an optional contact surface of the filter retainer for the cleaning element. What is important is that the cleaning element touches the retention filter and/or the contact surface of the filter retainer for the cleaning element not only locally, i.e. at a particular location, but that it remains in contact across a movement path with the retention filter or the contact surface, wherein this movement path along which the cleaning element touches the retention filter and/or the contact surface corresponds to at least half the extension or further preferably to (at least approximately) to the full extension of the retention filter or the contact surface in this direction of movement. This is particularly convenient for the preferred case of a straight or plane implementation of the retention filter and/or the movement back into the starting position for the translational movement for closing the brewing chamber. It is particularly convenient if the cleaning element is taken along by the brewing cylinder during its rotational movement section into the cleaning motion.

In further developing the invention it is advantageously provided that a previously mentioned first spring stop associated with the first compression spring, in particular a helical compression spring, is rotationally pivotably arranged during a movement phase of the cleaning element parallel to the retention filter and/or a contact surface of the filter retainer, in particular in that this first spring stop is coupled with the pivotable brewing cylinder or is formed by the same.

It has proved to be particularly convenient if the cleaning element is part of a cleaning bracket, wherein the cleaning element preferably connects two spring-loaded, preferably telescopically adjustable shanks of the bracket with one another, in particular in a straight line in a transverse direction. For a uniform spring contact pressure of the cleaning element on the retention filter and/or the filter retainer it has proven to be advantageous if the cleaning element is associated, in addition to the first compression spring, with a second compression spring and spaced apart from the same, wherein it is even further preferred if the first compression spring is arranged in the area of the first shank of the cleaning bracket and the second compression spring is arranged in the area of the second shank of the cleaning bracket.

It is particularly preferred if the brewing chamber is bounded by a cylinder bottom on a side facing away from the retention filter, which cylinder bottom is further preferably movable within the cylinder, in particular depending on the brewing cylinder position, preferably in such a way that, for a preferably translational adjustment motion of the brewing cylinder away from the retention filter, i.e. following a brewing process, this moves in the brewing cylinder in direction of the retention filter, whilst at the same time moving a cake of solid brewing residues which has remained in the brewing cylinder after the brewing in a forward or upward direction in the brewing cylinder, so that then during a further, in particular a rotational movement section of the brewing cylinder relative to a scraper the cake of solid brewing residues is scraped off the cylinder bottom and is able to slide into a solid brewing residues container preferably via a ramp laterally of the brewing cylinder.

With respect to an arrangement optimised as regards installation space it has proven to be particular advantageous if the cleaning element is arranged in such a way that towards the end of its adjustment motion relative to the filter retainer, it pivots past the previously mentioned scraper for scraping the cake of solid brewing residues off the brewing chamber bottom.

Especially preferred is a variant, in which the retention filter has a plane straight surface. Preferably the retention filter is contoured in a circular fashion on its circumference. Additionally or alternatively provision is made in a further development if any fixing means for fixing the retention filter on the filter retainer do not protrude beyond a retention filter surface. If, for example, a fixing screw, in particular a central fixing screw, is used for fixing the retention filter on the filter retainer, this may be implemented, for example, as a countersunk-head screw in order to avoid a step or a projection obstructing the scraping cleaning movement of the cleaning element.

The cleaning element provided in the state of the art which does not touch the retention filter, is made of metal or metallic wire. This kind of implementation may also be used on a brewing unit configured according to the concept of the invention. It is, however, preferred if the cleaning element is manufactured from a softer material, in particular a plastic and/or comprises a scraping lip, in particular made of an elastomeric material, in order to keep the mechanical load on the retention filter during the friction motion to a minimum. Any material loss as a result of the friction can be compensated for in height by the spring effect of the spring means.

During the brewing process the cleaning element is preferably in a park position, in particular laterally of the filter carrier, wherein it is especially preferred if the cleaning element is supported in the park position such that the at least one compression spring is elastically compressed.

The invention also leads to a coffee machine, in particular a fully automatic coffee machine, comprising a brewing device configured according to the concept of the invention, which is either permanently installed or removably arranged in a manner known as such, for cleaning purposes. Preferably the coffee machine is a machine for preparing espresso, ordinary coffee, cappuccino etc. Further preferably the coffee machine comprises a grinding mechanism for freshly grinding coffee beans, wherein in this case an option for filling already ground coffee beans into the coffee machine from outside may be provided.

BRIEF DESCRIPTION OF THE DRAWINGS

Further advantages, features and details of the invention are revealed in the description below of a preferred embodiment and in the drawings, in which.

In the figures identical elements and elements having the same function are marked with identical reference symbols.

DETAILED DESCRIPTION

Figure 1:
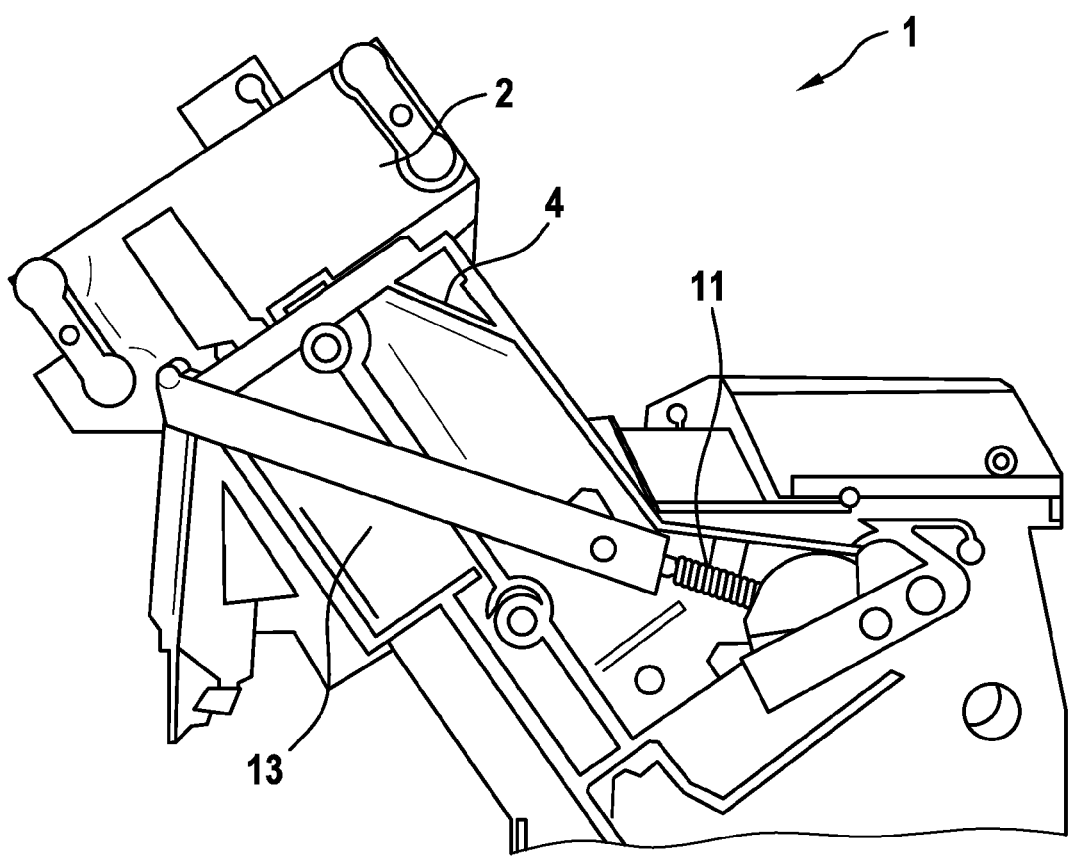
FIG. 1 to FIG. 6 show different motion states of a brewing unit of a coffee machine.
Figure 2:
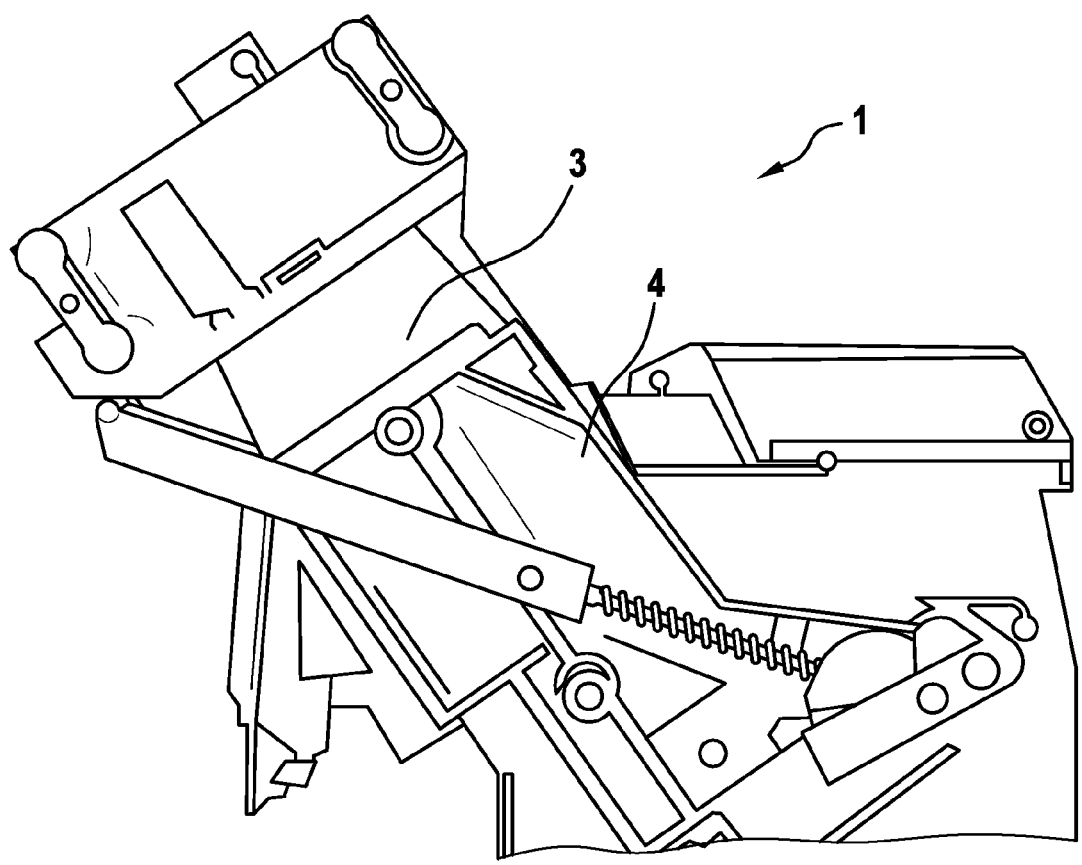

FIGS. 1 to 6 shows a brewing device 1 which can be removed from the coffee machine for cleaning purposes, with which a coffee product can be produced from ground coffee beans with the aid of hot pressurised brewing water.

The brewing device 1 comprises an injection-moulded support structure 2. This, within a sliding block guide, supports among others a filter retainer 3 shown e.g. in FIG. 3 and configured as a brewing piston, at whose face 5, which faces an adjustable brewing cylinder 4, a retention filter 6 configured as a metal sieve is fixed by means of a central countersunk-head screw.

The brewing cylinder 4 together with the filter retainer 3 and a brewing cylinder bottom (not shown) in the brewing cylinder 4 bounds a brewing chamber, into which pressurised hot brewing water can be introduced through openings in the brewing cylinder bottom.

A cleaning element 7 made of plastic is arranged on the brewing cylinder 4 (brewing cylinder assembly) and/or coupled to the same and this extends across the entire width extension of the retention filter 6. The cleaning element 7 is formed by a cross member of a plastic cleaning bracket 8 which comprises two parallel telescopic shanks 9, 10 connected with each other via the cleaning element 7. The telescopic shank marked with the reference symbol 10 is associated with a first compression spring 11, which at one end is supported at an upper portion of the longitudinally variable telescopic shank 10 and at the other end is fixed on the brewing cylinder 4, so that an adjustment motion of the brewing cylinder 4 automatically also causes an adjustment motion of the cleaning element 7. To adjust (move) the brewing cylinder 4 an electric motor not shown is provided which engages in a positively locking coupling known as such of the brewing device and the rotational movement of which leads to the desired translational and rotational adjustment motion of the brewing cylinder 4 via a sliding block guide also known as such.

In addition to the first compression spring 11 a second compression spring not recognisable in the views of the figures, is provided which by analogy, is associated with the telescopic shank marked with the reference symbol 9. These two identical compression springs 11 ensure that the spring load acting on the cleaning bracket 8 and thus on the cleaning element 7 is uniform in a direction away from the brewing cylinder 4 during a cleaning motion toward the retention filter 6.

In the following the operation of the brewing device 1 and in particular of the cleaning element 7 will be described.

In FIG. 1 the brewing cylinder 4 is in a brewing position—the brewing chamber 13 is closed. The cleaning element 7 is in a park position, supported laterally against the support structure 2, the compression springs 11 are fully compressed.

In this position pressurised hot brewing water is introduced into the brewing chamber 13, leaving the same through tiny openings in the retention filter 6 and flowing through an outlet not shown into a drinking vessel.

After completing the brewing process the brewing cylinder 4 is translationally adjusted relative to the retention filter 6, in the drawing plane here obliquely downward, so that the filter retainer 3, more precisely a brewing piston, becomes visible in its upper portion. At the same time the cleaning bracket 8 is freed from its park position and can distance itself from the brewing cylinder 4 by a maximum distance, supported by the compression springs 11.

Figure 3:
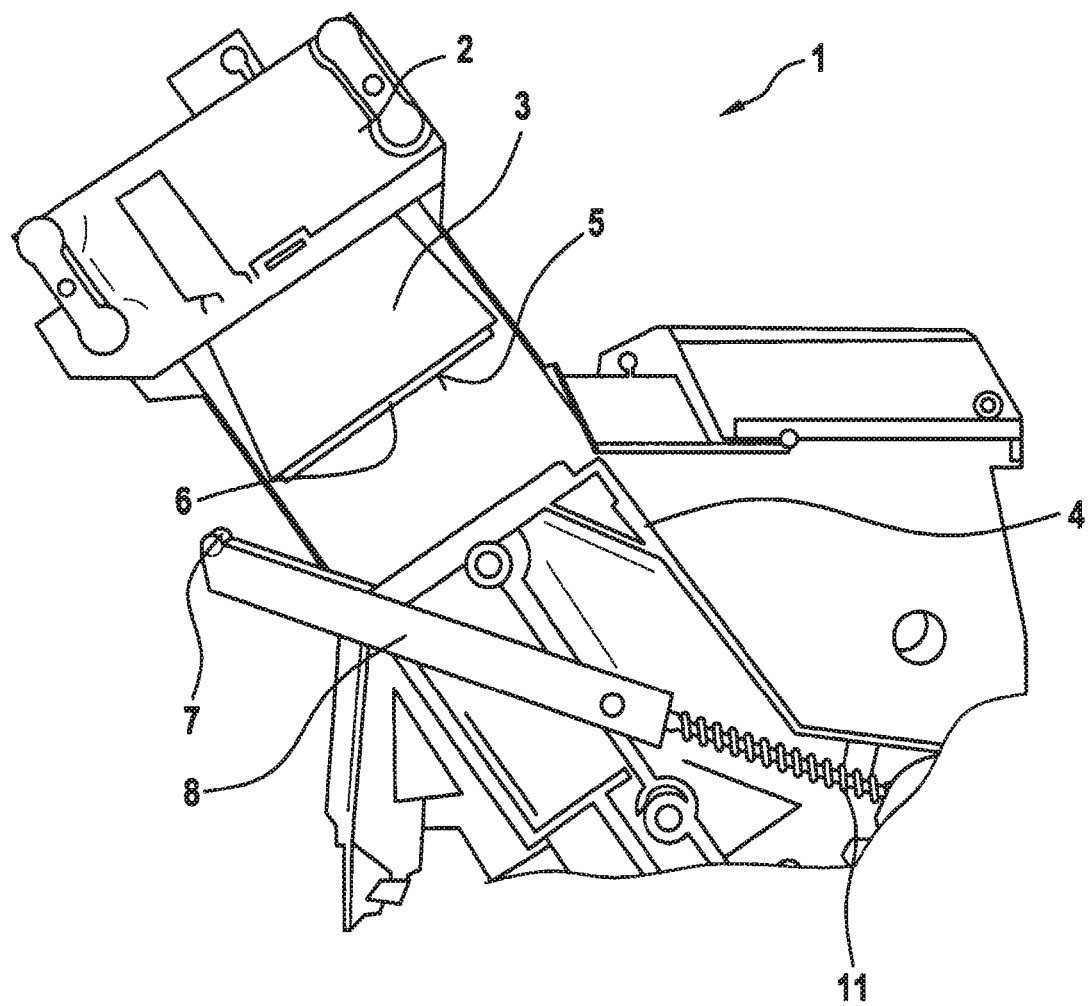
Figure 4:
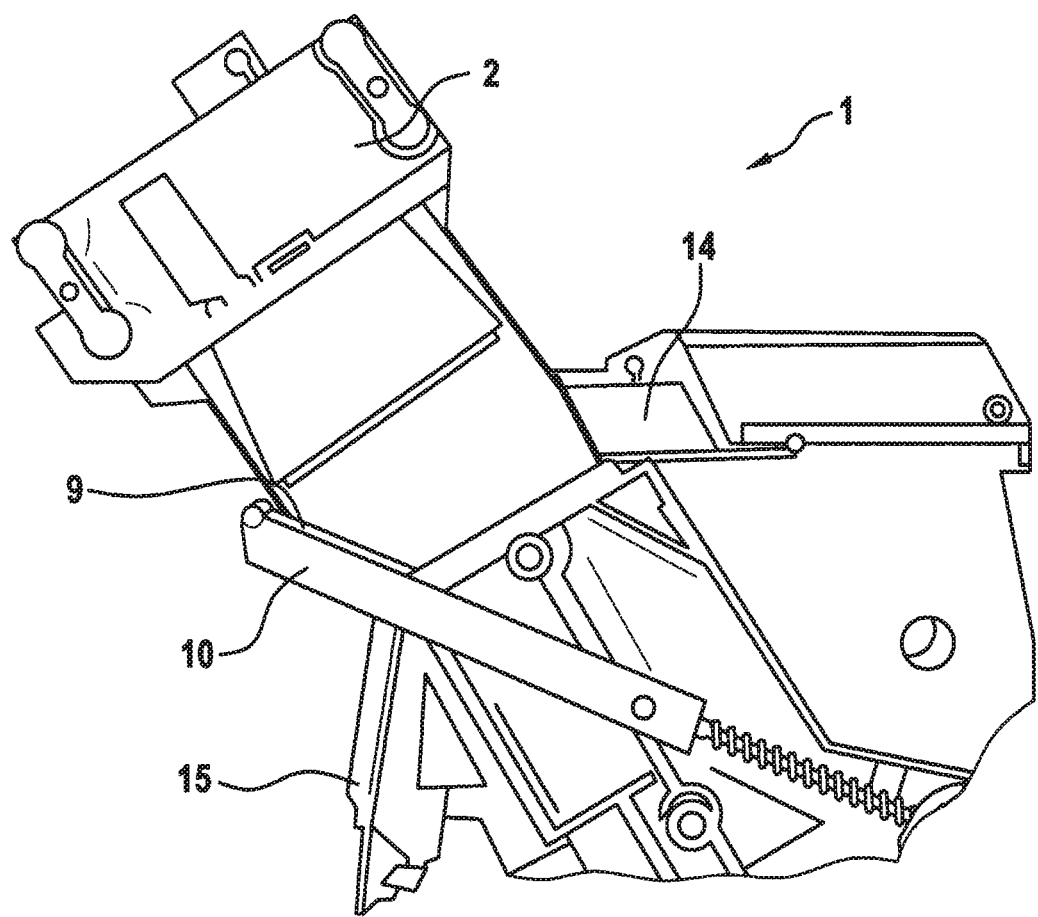
Figure 5:
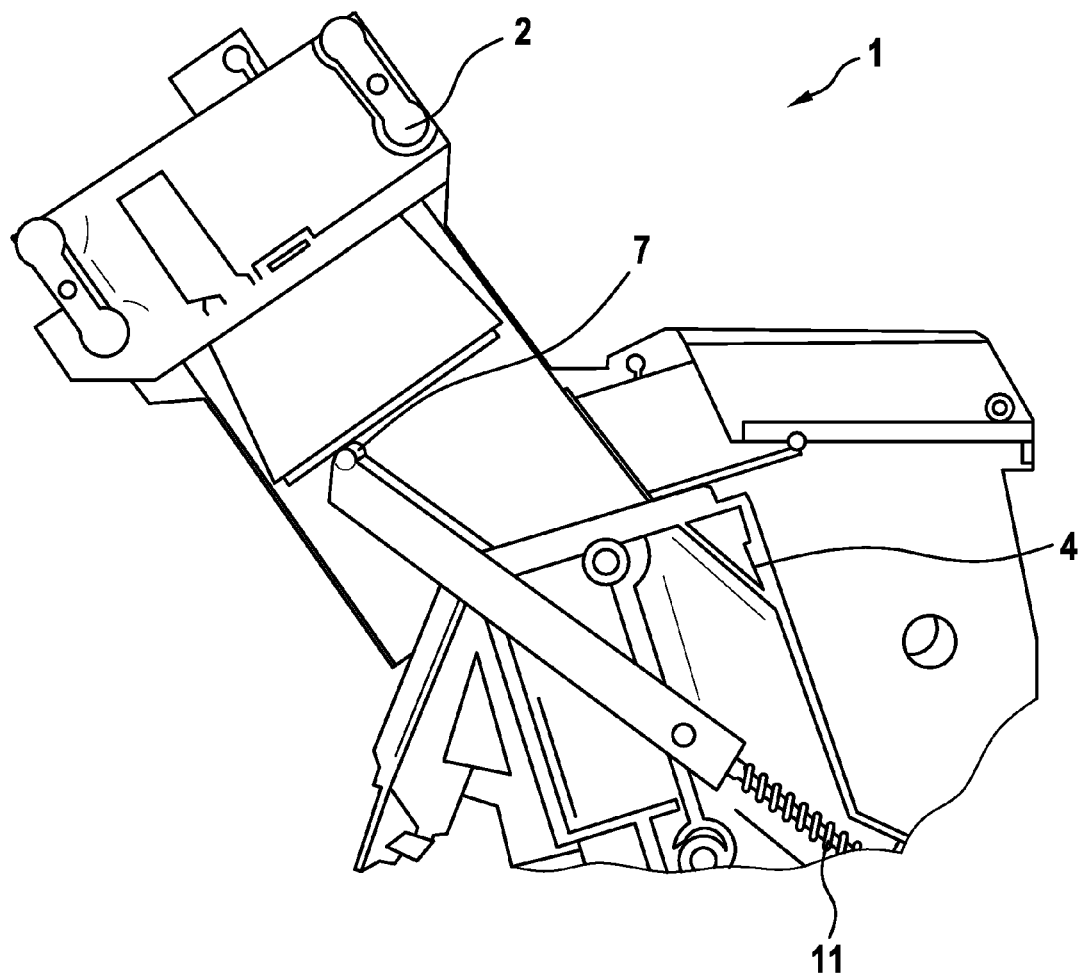

In the position shown in FIG. 3 the translational adjustment motion of the brewing cylinder 4 relative to the filter retainer 3 is finished. This can be recognised by the maximum distance between brewing cylinder 4 and retention filter 6. A leached compressed cake of solid brewing residues inside the brewing cylinder 4 up till then has been moved upwards by means of a brewing cylinder bottom not shown and is now almost on top of the brewing cylinder, although this is not shown in the drawings. The cleaning element 7 can be seen in the drawing plane left and below or spaced apart from the retention filter 6.

Next a rotational movement of the brewing cylinder 4 takes place towards the right in the drawing plane relative to a scraper 14, which during the rotational movement of the brewing cylinder 4 ensures that the cake of solid brewing residues not shown is scraped off and in the end can slide off via a lateral ramp 15 of the brewing cylinder 4 into a solid brewing residues container not shown. During the rotational movement the cleaning element 7 touches the side of the retention filter 6 facing the brewing cylinder 4 and scrapes along the same (touching it all the while), wherein during this cleaning motion any still adhering solid brewing residues are scraped off. Despite the rotational adjustment motion of the brewing cylinder 4 the cleaning element 7 moves parallel to the retention filter 6, wherein during this cleaning motion the compression springs 11 compensate for the height difference and are get increasingly more compressed.

Figure 6:
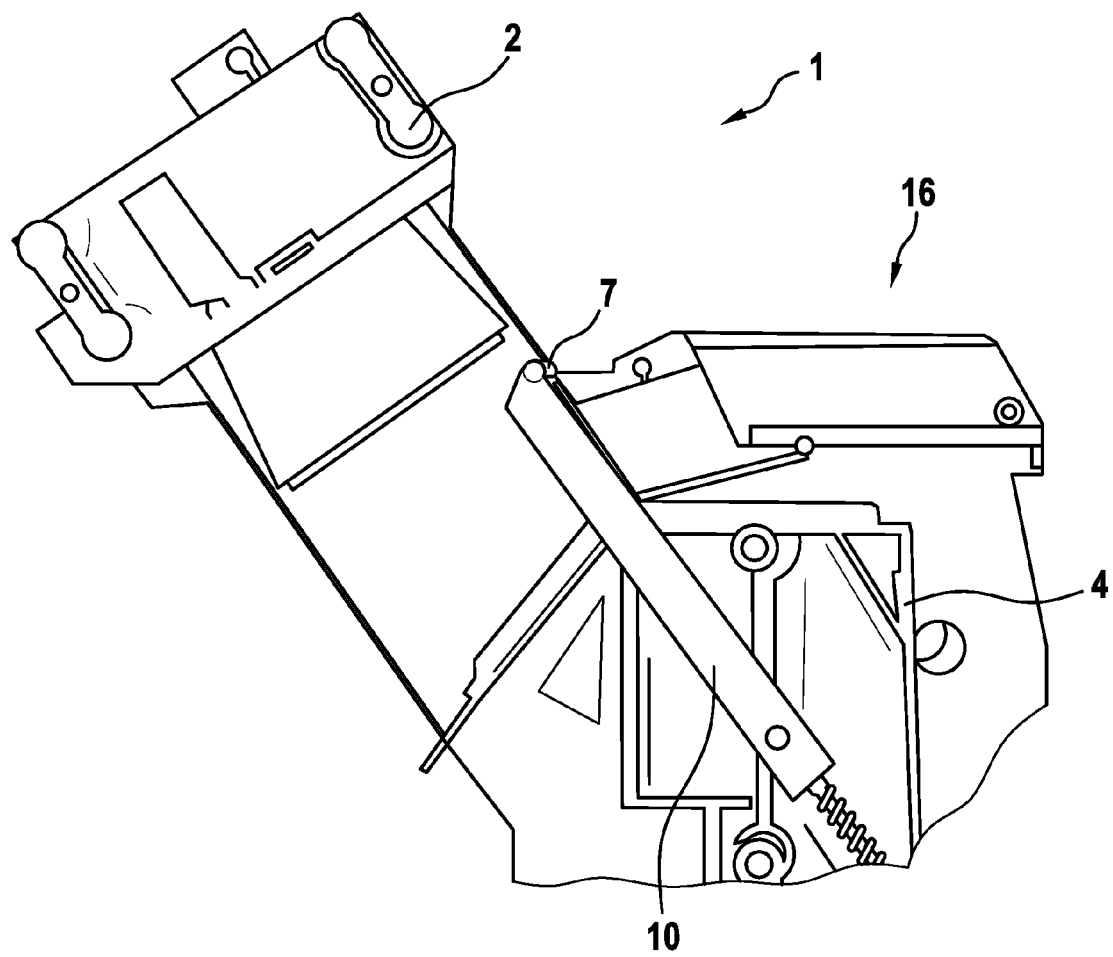

As can be recognised in FIG. 6 the cleaning element 7, following the cleaning motion or following completing the pivoting motion section of the brewing cylinder 4, is situated next to and spaced apart from the retention filter 6. The brewing cylinder 4 is in a loading position, in which ground coffee beans (coffee) can be added through an upper opening 16 not shown, wherein the coffee powder is supplied either directly from an integral grinding mechanism of the coffee machine or alternatively is added by hand or further alternatively is supplied from a coffee powder storage container.

Following the loading operation the brewing cylinder performs a movement into the opposite direction (movement sequence from FIGS. 6 to 1) into the brewing position, in which pressurised hot water is added to the coffee powder during the brewing process.

The invention claimed is:

1. A brewing device for a coffee machine comprising a filter retainer (3) which holds a retention filter (6) for ground coffee beans and which is designed as a filter carrier, a brewing cylinder (4), which is moved relative to the filter retainer (3) between a loading position for ground coffee beans and a brewing position and which bounds a brewing chamber (13) together with the retention filter (6) of the filter retainer (3) in the brewing position, which brewing chamber has an inlet for pressurised brewing water, wherein a brewing chamber bottom can be moved within the brewing cylinder and the brewing cylinder is moved into the loading position relative to a scraper in a movement step in order to scrape a cake of solid brewing residues from the brewing chamber, and a cleaning element (7) for removing solid brewing residues adhering to the retention filter (6) after a brewing process during a cleaning motion, the filter retainer (3) and the cleaning element (7) are spring-loaded toward each other in such a way that the cleaning element (7) touches the retention filter (6) and/or the filter retainer (3) during the cleaning motion of the cleaning element and thereby scrapes off the adhering solid brewing residues, and in that the cleaning element (7) is spring-loaded away from the brewing cylinder in direction of the retention filter (6) by means of a first compression spring (11) during the cleaning motion, wherein the cleaning element (7) is part of a cleaning bracket (8) which is spring-loaded by a second compression spring (11) during the cleaning motion in direction toward to the retention filter (6).

2. The brewing device according to claim 1, wherein the cleaning element (7) is movably arranged in such a way that during a cleaning motion it moves, at least in sections, in parallel to the retention filter (6) or a contact surface of the filter retainer (3) and touches this over a movement path, which corresponds to at least a half extension or a full extension of the retention filter (6).

3. The brewing device according to claim 1, wherein the cleaning element (7) is mechanically coupled with the brewing cylinder (4) such that a pivoting motion of the brewing cylinder causes the cleaning motion of the cleaning element (7).

4. The brewing device according to claim 1, wherein a spring stop (12) associated with the first compression spring (11) is arranged to be pivoted in a rotational manner during a translational movement phase of the cleaning element (7).

5. The brewing device according to claim 1, wherein the cleaning bracket comprises two parallel telescopic shanks (9, 10).

6. The brewing device according to claim 1, wherein the cleaning element (7) is arranged in such a way that towards an end of its adjustment motion relative to the filter retainer (3) it pivots past the scraper (14) for scraping the cake of solid brewing residues off the brewing chamber bottom which is adjustable relative to a circumferential wall of the brewing cylinder (4).

7. The brewing device according to claim 1, wherein the retention filter (6) comprises fastening means for fixing the retention filter (6) on the filter retainer (3) such that the filter retainer (3) does not protrude beyond the retention filter surface.

8. The brewing device according to claim 1, wherein the cleaning element (7) comprises a scraping lip made of an elastomeric material.

9. The brewing device according to claim 1, wherein the cleaning element (7) during its cleaning motion moves from bottom to top and is spring-loaded in direction toward the retention filter (6).

10. The brewing unit device according to claim 1, wherein the cleaning element (7) during the cleaning process is arranged in a park position and when in the park position is supported against a support structure (2) and the first compression spring is compressed to a maximum.

11. The brewing unit device according to claim 10, wherein the cleaning element, following completion of the brewing process, is moved from the park position downwards by pivoting the brewing cylinder.

* * * * *